United States Patent
Garcia-Ramirez et al.

(10) Patent No.: US 6,376,068 B1
(45) Date of Patent: Apr. 23, 2002

(54) INSULATION PROTECTION TAPE

(75) Inventors: Rafael Garcia-Ramirez, Dripping Springs; David V. Mahoney, Austin, both of TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/482,580

(22) Filed: Jan. 13, 2000

Related U.S. Application Data

(62) Division of application No. 09/005,057, filed on Jan. 9, 1998, now abandoned.

(51) Int. Cl.⁷ .............................. B32B 7/12; B32B 5/16
(52) U.S. Cl. ....................................... 428/343; 428/327
(58) Field of Search ................................. 428/343, 327, 428/328, 330

(56) References Cited

U.S. PATENT DOCUMENTS

| | | | |
|---|---|---|---|
| 3,530,164 A | | 9/1970 | Gillham et al. ............. 260/45.8 |
| 3,849,240 A | * | 11/1974 | Mikulak ..................... 138/149 |
| 4,130,535 A | * | 12/1978 | Coran et al. ................ 260/33.6 |
| 4,373,048 A | | 2/1983 | Schubert et al. |
| 4,594,390 A | | 6/1986 | Abdou-Sabet et al. ...... 525/232 |
| 4,705,715 A | * | 11/1987 | DeCoste et al. ........ 156/244.11 |
| 4,769,283 A | | 9/1988 | Sipinen et al. .............. 428/343 |
| 4,772,642 A | | 9/1988 | Staendeke ................... 523/205 |
| 4,780,347 A | * | 10/1988 | Cohen ......................... 138/149 |
| 4,808,474 A | | 2/1989 | Sipinen ....................... 428/343 |
| 4,910,639 A | | 3/1990 | Schloegi et al. ............. 361/323 |
| 4,957,968 A | | 9/1990 | Adur et al. .................... 525/74 |
| 4,985,024 A | | 1/1991 | Sipinen ....................... 604/389 |
| 5,017,637 A | | 5/1991 | Smith et al. ................. 524/354 |
| 5,130,357 A | | 7/1992 | Akitaya et al. .............. 524/100 |
| 5,284,889 A | * | 2/1994 | Pyun et al. .................. 428/463 |
| 5,290,886 A | * | 3/1994 | Ellul ........................... 524/515 |
| 5,300,356 A | | 4/1994 | Dempster et al. ........... 428/200 |
| 5,427,849 A | * | 6/1995 | McClintock et al. ........ 138/128 |
| 5,574,105 A | * | 11/1996 | Venkataswamy ............. 525/179 |
| 6,096,814 A | * | 8/2000 | Tamura et al. .............. 428/343 |

FOREIGN PATENT DOCUMENTS

| | | | | |
|---|---|---|---|---|
| EP | 0 204 027 A1 | | 12/1986 | ........... C08K/13/02 |
| EP | 0 215 189 | | 3/1987 | ........... B60R/13/00 |
| EP | 0 274 888 A1 | | 7/1988 | ........... C08K/3/00 |
| EP | 0 821 035 A1 | | 1/1998 | ........... C08L/67/02 |
| FR | 2303044 | | 10/1976 | ........... H01B/3/44 |
| JP | 04139241 A | | 9/1990 | ........... C08L/23/00 |
| JP | WO98/05714 | * | 2/1998 | ........... C08L/23/10 |

* cited by examiner

*Primary Examiner*—Tom Dunn
*Assistant Examiner*—Zidia Pittman
(74) *Attorney, Agent, or Firm*—Darla P. Fonseca

(57) ABSTRACT

An insulation protection film useful in a comprise a two-phase thermoplastic elastomer blend comprising a continuous phase and a particulate phase, and a flame retardant wherein the film substrate has a storage modulus of at least about $10^7$ Pascals up to about 150° C.

14 Claims, No Drawings

INSULATION PROTECTION TAPE

This Application is a divisional of U.S. Ser. No. 09/005,057, filed Jan. 9, 1998, now abandoned.

BACKGROUND OF THE INVENTION

1. Field of the Invention

This instant invention relates to a two-phase thermoplastic elastomer substrate film for an adhesive tape and an adhesive tape comprising a non(poly(vinyl chloride)) containing substrate film backing, which provides good adhesion to itself and to pipe insulation over steel pipes, along with excellent properties in both cold temperatures and high temperatures.

2. Description of the Related Art

In industries which have large pipes to convey liquids or gases such as the petrochemical industry, the pipes are frequently stainless steel or other metals which are prone to corrosion. The pipes are typically covered with insulation which may be a variety of materials such as polyurethane foam, ceramic foam, fibrous materials, fiberglass or the like. Other possible layers include an anticorrosion coating on the pipe, and a water-vapor barrier layer over the insulation to prevent water entry. The corrosion protection element placed thereover has commonly been metal cladding. This cladding is formed from stainless steel or aluminum into preformed shapes (tees, elbows, clam shells, etc.) and shipped to the location of installation. The preformed shapes are placed over the insulation (and other layers discussed above, if any) and held together by steel bands or rivets and screws. The seams in the cladding are usually caulked with a silicone caulk. This system has many difficulties; it is expensive to make and to transport and install. Further, the cladding has no flexibility. This can cause problems if any distortion occurs in the claddings, such as that caused by irregularities in the pipe surface, or inexact fit. The seams then tend to open and not be reclosable, which allows for entry of water and other contaminants. The cladding is also subject to corrosion itself.

Polymeric materials are flexible, and desirable for use as insulation protection layers for various applications, some of which require flame retardance. Such a material, when used with an adhesive would offer reduced expense, labor, and safer installations, along with reentry ease and flexibility, but requires both the ability to adhere at low temperatures, and to have stability at high temperatures. A variety of efforts have been made to improve either the flame retardance or the adhesion of such materials, especially in temperature extremes. However, many materials have poor dimensional stability at high temperatures, and reduced flexibility and/or adhesion at low temperatures.

It is known that thermoplastic polymers may be rendered flame resistant by the addition of organohalide compounds, such as those disclosed in U.S. Pat. No. 3,530,164. One problem with use of these compounds however is that they migrate through the polymer and bloom to the surface, where the exudate causes a dullness which is aesthetically displeasing. Also, of course such blooming results in loss of flame retardance. A second problem is dripping if the polymer melts during flame contact. Finally, many applications require that the materials used be free of poly(vinyl chloride)s for environmental and/or safety reasons.

WO 9729153 discloses a thermoplastic elastomer composition which, when used as, at least the inner layer of a hose, attains an improvement in the flexibility, oil resistance and low-temperature properties.

U.S. Pat. No. 5,300,356 discloses a tape wrap system for protecting metal tubes and pipes from corrosion comprising a primer coating, an inner wrap and an outerwrap. The innerwrap is a polyolefin layer with an adhesive on the inner surface and a heat fusible material on its outer surface, and the outerwrap is an impact-resistant polyolefin layer having a heat fusible layer on one or both surfaces. Heating fuses the innerwrap and outerwrap into a continuous closed protective coating.

U.S. Pat. No. 5,017,637 discloses fire-retardant thermoplastic compounds that are chemically crosslinked, comprising 5–60% olefinic copolymers, 1–15% organopolysiloxane, and 20–85% flame retardant. Preferred embodiments include a copolymer, and an additional elastomer or ethylene copolymer. The preferred elastomers are EP or EPDM copolymers. Ethylene vinylacetate is also disclosed. Metal oxide hydrates are used as the fire-retardant compound.

U.S. Pat. No. 4,772,642 discloses a resin containing polyolefins, preferably polypropylene. Ammonium polyphosphate particles are used for flame retardance, and a melamine resin encapsulates the particles.

EP Patent 274,888 discloses a flame retardant halogen-free elastomer composition containing greater than 50% inorganic filler. Addition of a coupling agent is not disclosed.

JP Patent 04,139,241 discloses an olefinic resin blended with ammonium polyphosphate, a silane coupling agent, and olefinic synthetic rubber and a petroleum resin. An example of the silane is vinyl trimethoxysilane. Advantages of this compound are high electrical resistance and high bleed resistance.

U.S. Pat. No. 5,130,357 discloses a flame retardant composition containing polypropylene as the major constituent, a silane coupling agent, and/or olefinic synthetic rubbers, ammonium polyphosphate (APP) or melamine-modified APP and one or more nitrogen compounds, and optionally polyethylene resin, crosslinking agent and thiophosphate.

U.S. Pat. Nos. 4,808,474 and 4,769,283 disclose a pressure-sensitive adhesive tape film substrate having improved toughness comprising blends of crystalline isotactic polypropylene and compatible flexible polymers (in the former) or compatible ethylene containing polymers (in the latter), such polymers including EPDM and/or EVA.

U.S. Pat. No. 4,985,024 discloses a biodegradable pressure-sensitive adhesive tape film substrate comprising such a blend combined with an unsaturated elastomer.

U.S. Pat. No. 4,910,639 discloses a biaxially oriented film suitable for use as an electrically insulating film. The film is composed of polyolefins, and contains carbonate particles as a neutralizing agent.

U.S. Pat. No. 4,594,390 discloses a thermoplastic elastomer comprising a blend of plastic and cured rubber produced by masticating during vulcanization at a shear rate of at least 2000 $sec^{-1}$. Such compositions may include other ingredients such as fillers, carbon black, clay, silica, plasticizers, and the like.

It has now been discovered that an adhesive tape formed from adhesive coated onto a film substrate that contains a two-phase thermoplastic elastomer along with a flame retardant, provides excellent protection to the insulation commonly used around steel piping even when subjected to low temperature extremes. The film substrate also exhibits excellent high temperature stability. The film substrate and tape of the invention also offer advantages over currently available products which use poly(vinyl chloride) as a major ingredient in their substrates; the amount of corrosive gases released on combustion and water vapor transmission rates are reduced, while flame retardance is maintained and extreme temperature properties are improved.

SUMMARY OF THE INVENTION

The instant invention provides a film substrate useful for forming the backing of an adhesive tape which provides good adhesion to itself along with excellent flame retardance, increased flexibility at low temperature, and high temperature dimensional stability.

Specifically, film substrates of the invention comprise a two-phase thermoplastic elastomer blend comprising a continuous phase and a particulate phase, and a flame retardant wherein the film substrate has a storage modulus of at least about $10^7$ Pascals up to about 150° C.

Preferred film substrate of the invention comprise a two-phase thermoplastic elastomer blend having a continuous phase formed from a polyolefin selected from polypropylene or polyethylene and mixtures thereof, and a particulate phase formed from a copolymer formed from monomers selected from the group consisting of ethylene, propylene, and diene monomers.

Adhesive tapes of the invention comprise an adhesive coating coated onto a film substrate which has a composition comprising a two-phase thermoplastic elastomer blend, at least one flame retardant.

Preferred tapes of the invention require that the film substrate composition comprise a thermoplastic elastomer blend which is selected from blends having a continuous phase formed from a polyolefin selected from polypropylene or polyethylene and a particulate phase formed from a copolymer formed from monomers selected from the group consisting of ethylene, propylene, and dienes.

Highly preferred tapes have a substrate film containing a thermoplastic elastomer blend containing a reduced amount of water-leachable chlorides.

Terms used herein have the following meanings.

1. The term "leachable" means that a chemical compound is not bonded and will be carried by a solvent such as water out of the composition.

2. The term "adhesive" means a sticky medium that retains a tape in place.

3. The terms "conformability" and "conformable" refer to the ability of a tape to make essentially complete contact with the surface of an irregular object without creasing or folding.

4. The term "insulation protection tape" means a tape which is applied over insulation layers surrounding a pipe to protect the pipe from corrosion and/or the insulation from mechanical damage, contamination, water transmission and the like.

All percents, parts and ratios herein are by weight unless specifically noted otherwise.

DETAILED DESCRIPTION OF THE INVENTION

The film substrates of the invention comprise a two-phase thermoplastic elastomer blend. Useful thermoplastic elastomers include polyolefins such as polypropylenes, polyethylenes and the like. These thermoplastic elastomer blends comprise a continuous phase and a particulate phase. The continuous phase should include at least one polyolefin, preferably, polypropylene or polyethylene. The particulate phase includes copolymers formed from ethylene, propylene, and diene monomers, preferably ethylene propylene, ethylene propylene diene terpolymers, and the like. Commercially available examples include Santoprene®, from Advanced Elastomers Systems, "Alt 8000", available from Alternative Rubber and Plastics, and Uniprene®, available from Teknor Apex.

In one embodiment of the film substrates and adhesive tapes of the invention, the thermoplastic elastomers useful in the film substrate are low in water-leachable chlorides. Specifically, elastomers having less than about 100 ppm, preferably less than about 90 ppm water-leachable chlorides are more useful in this application as the tapes could leach chlorides to either the environment or through the adhesive into the insulation, and through the insulation to the pipe itself. Leachable chlorides have issues with toxicity, health and corrosion of the materials that the tapes are meant to protect, a matter of special concern for pipe jacketing for the petrochemical industry and the like.

The thermoplastic elastomer blend comprises from about 45% to about 75% of the substrate composition, preferably from about 60% to about 75% by weight of the composition of the film substrate.

Film substrates of the invention exhibit good flexibility and adhesive tapes using such substrate exhibit good adhesion even under low temperature conditions, e.g., 0° C. or −18° C.

Film substrates of the invention also exhibit excellent dimensional stability over conventional poly(vinyl chloride) substrates. When the film is subjected to high temperature, the storage modulus (E') does not significantly drop in value, but remains above $10^7$ Pascals at temperatures of from about −150° C. up to about 150° C. Conventional film substrates made with poly(vinyl chloride), and tapes made therewith, have storage moduli which drop below $10^7$ Pascals at about 100° C., and below $10^6$ Pascals at about 150° C.

The film substrate also contains at least one flame retardant. Where nonhalogenated flame retardants are desirable, useful retardants include phosphorous-based flame retardants such as ammonium polyphosphate, melamine phosphate, and/or red phosphorous. For example, flame retardants are available under the trade names Exolit® IFR-10 and Exolit® IFR-23, comprise ammonium polyphosphate in admixture with a variety of other coagents, fillers and pigments.

Other suitable flame retardants are disclosed in EP 0204027 and comprise mixtures of ammonium polyphosphate, melamine cyanurate and a hydroxyalkyl derivative of isocyanuric acid, at least partially in the form of a homopolymer. Examples of these materials are commercially available under the trade name Masterflam®. Other suitable flame retardants comprise oligomeric phosphorus/nitrogen flame retardants containing a triazine nucleus, used in conjunction with ammonium polyphosphate, and polyphosphonamide derivative used in conjunction with ammonium polyphosphate. Other useful classes are the phosphate salts of polyols such as pentaerythritol e.g. Great Lakes CN1197, and aluminum trihydrate flame retardants, which are widely available.

Preferred film substrates of the invention contain a brominated flame retardant. Useful brominated flame retardants include ethylene-bis(tetrabromophthalimide), decabromodiphenyl oxide, and tetrabromocyclooctane and the like. Commercial embodiments include Saytex® flame retardants, available from Albemarle Corporation, include Saytex® 8010, and Saytex® BT-93W. Preferred film substrate compositions comprise from about 5% to about 25% of the brominated flame retardant.

To further improve the flame retardancy of the compositions using brominated flame retardants, various metal compound synergists such as oxides or hydroxides may be added. Useful compounds include alkaline earth metal oxides such as barium oxide, magnesium oxide, as well as such compounds as silicon dioxide, titanium dioxide, zinc oxide, aluminum oxide, aluminum oxide trihydrate, antimony oxides, alkaline earth metal hydroxides and the like. When present, these additives generally comprises from about 2 to about 10 percent by weight of the total composition.

The film substrate also preferably contains at least one filler such as clay, talc, alumina and the like. Useful fillers include those commercial available as "Mistron" from Luzenac America. Inclusion of such a filler helps to prevent dripping during flame testing. Preferred compositions include from about 5% to about 15% of the filler.

Compositions of the invention may also incorporate conventional adjuvants such as plasticizers, dyes, pigments, antioxidants, antistatic agents and the like in such amounts as will not substantially affect the primary properties of the composition. A preferred adjuvant is a UV stabilizer or blend thereof. Useful stabilizers include phosphite antioxidants, hindered amine-type light stabilizers, benzophenone type light absorbers, and mixtures thereof. Film substrates of the invention comprise from about 0.05% to about 2% of such UV stabilizer(s).

The ingredients for the film substrate may be compounded by any conventional method such as mixing or blending, followed by film-forming process such as milling, extruding, laminating or other casting techniques. Extrusion is a preferred method; either single or twin-screw extruders are useful.

Tapes of the invention have at least one side of the film substrate coated with an adhesive. The adhesive may be any conventional adhesive known in the art, including but not limited to, natural rubber, thermoplastic elastomers, such as block copolymers, thermoset adhesives, acrylic adhesives, silicone adhesives and the like. The adhesive may further comprise such conventional additives as tackifiers, plasticizers, pigments, fillers, initiators, crosslinking agents, and the like, as desired. The adhesive is applied to the film substrate by conventional coating means.

In a preferred embodiment, the adhesive is a mastic type adhesive comprising at least one compound selected from polyisobutylene, polybutene, aliphatic hydrocarbon resins, butyl acrylate, or the like, and at least one flame retardant compound, which may be brominated or nonhalogenated, as desired.

The adhesive tape of the invention is useful for providing protection to insulation coverings over metal pipes, also called pipejacketing. The tape may be made in widths of from less than 2 cm to 60 cm or more, as desired.

Because the adhesive tape of the invention has good adhesion to itself and to friable insulation materials, such as asbestos, fiberglass and the like, it would also be useful for encapsulating such materials for reasons of safety, toxicity and convenience, such as covering asbestos in older buildings.

The following examples are meant to be illustrative and should not be construed as limiting the scope of the invention, which is defined only by the claims. One skilled in the art would be able to create variations which would be within the spirit of the invention.

Test Methods

Adhesion

Peel adhesion is the force required to remove an adhesive coated flexible sheet material from a test panel measured at a specific angle and rate of removal. In the examples, this force is expressed in Newtons per 100 mm width of coated sheet. The procedure followed is:

A strip 1.27 cm in width of the coated sheet is applied to the horizontal surface of a clean glass or stainless steel test plate with at least 12.7 lineal cm in firm contact. A 2 kg hard rubber roller is used to apply the strip. The free end of the coated strip is doubled back nearly touching itself so the angle of removal will be 180°. The free end is attached to the adhesion tester scale. The test plate is clamped in the jaws of a tensile testing machine which is capable of moving the plate away from the scale at a constant rate of 25.4 centimeters per minute. The scale reading in Newtons is recorded as the tape is peeled from the test plate surface. The data are reported as the average of the range of numbers observed during the test.

Water Absorption

A pre-weighed sample (weight=$W_1$) is placed in deionized water for 24 hours. Following the immersion period, the sample is removed, wiped dry and weighed (weight=$W_2$). The percent water absorption is $[W_2-W_1]/W_1 \times 100$.

Flammability Evaluation

This test measures the flammability of the material under an intense heat source as well as secondary ignition properties. This test is ASTM-1000.

A layer of tape is wrapped around a 3.175 mm diameter brass rod which is suspended horizontally. A layer of loosely packed cotton is position beneath the sample. A lit Bunsen® burner is held under the pipe for 30 seconds. Burn time is measured after removal of the flame. A passing grade requires that the burn time be less than 10 seconds, and that the cotton cannot catch on fire, signaling secondary ignition.

UL-510 Burn Test

This is an ANSI/UL-510 standard test to evaluate self sustaining flame and secondary ignition.

EXPERIMENTAL

Examples 1 and 1C

Adhesion properties of the inventive tape were tested at room temperature and at 0° C. Adhesion to steel and adhesion to backing were tested, using ASTM D1000 standards. A summary of the results are listed in Tables 1 and 2.

Example 1C is a commercially available corrosion protection tape having a poly(vinyl chloride) containing substrate film and using a similar mastic adhesive to that of Example 1.

Adhesion, and mechanical properties were tested at room temperature, 0° C. and −18° C. As is shown in the tables below, the tape using a film substrate of the invention retained good properties even at low temperatures.

Two types of burn testing were also completed on the Example 1 tape. For the ASTM-D1000 flammability test, the tape extinguished quickly, passing the test. In four of five trials, the burning time was at or less than 1 second, with the fifth extinguishing at 1.5 seconds. Details of the UL-510 test and variations are provided in Table 4. Due to the potential thickness of the tape application, different geometries were tested; the UL 510 calls for three wraps with a half overlap. The more severe conditions, using only one wrap, and one wrap with no overlap geometry, was also tested. As can be seen below in Table 4, adhesive tape of the invention easily passed all three tests.

TABLE 1

Adhesion and Elongation Properties at Room Temperature

|    | ATS (N/100 mm) | ATB (N/100 mm) | Elongation (%) | Break strength (kPa) | Thickness (mm) | Linear Stress @ breakpoint (N/100 mm) |
|----|----|----|----|----|----|----|
| 1C | 95  | 63  | 271 | 7957 | 1.47 | 1173 |
| 1  | 193 | 161 | 621 | 3254 | 1.42 | 461 |

TABLE 2

Adhesion and Elongation Properties at 0° C.

|    | ATS (N/100 mm) | ATB (N/100 mm) | Elongation (%) | Break strength (kPa) | Thickness (mm) | Linear Stress @ breakpoint (N/100 mm) |
|----|----|----|----|----|----|----|
| 1C | 146 | 78 | 271 | 11,018 | 1.45 | 1594 |
| 1  | 152 | 96 | 600 | 5474  | 1.30 | 718 |

Tensile and Elongation

Tensile and elongation (T & E) tests indicate flexibility. T & E's were performed at room temperature, 0° C. and −18° C. Flexibility and conformity is required during application of an insulation protection tape. Tables 1, 2 and 3 show data for Elongation; as can be seen, good elongation and break strength is retained by the adhesive tape of the invention, when compared to the conventional poly(vinyl chloride) containing material of Example 1C.

TABLE 3

Elongation Properties at −18° C.

|    | Elongation (%) | Break Strength (kPa) (Backing only) | Thickness (mm) | Linear Stress @ breakpoint (N/100 mm) |
|----|----|----|----|----|
| 1C | 230 | 34,400 | 0.518 | 1780 |
| 1  | 736 | 2350  | 0.467 | 580  |

TABLE 4

UL-510 Flammability

| Description | 1st burn | 2nd burn | 3rd burn | 4th burn | 5th burn | Secondary Ignition | % flag burned |
|----|----|----|----|----|----|----|----|
| UL-510 standards | <15 | <15 | <15 | <15 | <15 | no | <25% |
| UL-510 standards | 0 | 0 | <1 | 0 | 1 | no | 0% |
| One wrap, half overlap | 0 | 1.5 | 1 | 3 | 2 | no | 0% |
| One wrap, no overlap | 1 | 1 | 1.5 | 2 | 4 | no | 0% |

TABLE 5

Other Film Substrate Formulations

| Standard Order | Thermoplastic Elastomer Concentration (mass fraction) | Flame Retardant Concentration (mass fraction) | Synergist Concentration (mass fraction) | Filler Concentration (mass fraction) |
|----|----|----|----|----|
| 2  | 0.5    | 0.3    | 0.03  | 0.17   |
| 3  | 0.55   | 0.15   | 0.1   | 0.2    |
| 4  | 0.7    | 0.15   | 0.1   | 0.05   |
| 5  | 0.5    | 0.3    | 0.1   | 0.1    |
| 6  | 0.62   | 0.15   | 0.03  | 0.2    |
| 7  | 0.7    | 0.22   | 0.03  | 0.05   |
| 8  | 0.6425 | 0.15   | 0.065 | 0.1425 |
| 9  | 0.5    | 0.235  | 0.065 | 0.2    |
| 10 | 0.585  | 0.3    | 0.065 | 0.05   |
| 11 | 0.625  | 0.225  | 0.1   | 0.05   |
| 12 | 0.6067 | 0.2317 | 0.03  | 0.1317 |
| 13 | 0.56   | 0.22   | 0.1   | 0.12   |
| 14 | 0.56   | 0.21   | 0.03  | 0.2    |
| 15 | 0.56   | 0.3    | 0.03  | 0.11   |
| 16 | 0.7    | 0.15   | 0.03  | 0.12   |
| 17 | 0.7    | 0.15   | 0.1   | 0.05   |
| 18 | 0.5    | 0.3    | 0.1   | 0.1    |
| 19 | 0.7    | 0.22   | 0.03  | 0.05   |
| 20 | 0.5    | 0.235  | 0.065 | 0.2    |
| 21 | 0.55   | 0.15   | 0.1   | 0.2    |

TABLE 6

Measured Responses for other Formulations

| Standard Order | Burn Time (sec.) | Elongation (%) | Stress at 50% Elongation (kPa) | Handling Rating | Shore A Hardness |
|---|---|---|---|---|---|
| 2 | 0.18 | 300 | 3172 | 3 | 80 |
| 3 | 0.567 | 554 | 3172 | 1 | 79 |
| 4 | 2 | 1049 | 2379 | 10 | 72 |
| 5 | 1.92 | 530 | 2668 | 6 | 77 |
| 6 | 1.35 | 661 | 3041 | 1 | 76 |
| 7 | 1.58 | 970 | 2365 | 9 | 73 |
| 8 | 0.75 | 685 | 2841 | 6 | 72 |
| 9 | 0.633 | 464 | 3234 | 1 | 80 |
| 10 | 0.533 | 950 | 2441 | 10 | 73 |
| 11 | 0.92 | 947 | 2399 | 9 | 71 |
| 12 | 0.917 | 695 | 2751 | 4 | 76 |
| 13 | 0.517 | 694 | 2710 | 4 | 77 |
| 14 | 0.98 | 550 | 3041 | 5 | 79 |
| 15 | 0.517 | 785 | 2654 | 7 | 74 |
| 16 | 1.42 | 828 | 2613 | 8 | 73 |
| 17 | 1.77 | 939 | 2386 | 8 | 71 |
| 18 | 1 | 663 | 2675 | 5 | 77 |
| 19 | 1.25 | 973 | 2386 | 10 | 68 |
| 20 | 0.7 | 498 | 3220 | 2 | 76 |
| 21 | 0.55 | 610 | 3185 | 3 | 78 |

What is claimed is:

1. An insulation protection tape useful for pipejacketing comprising an adhesive and a film substrate, said substrate comprising a two-phase thermoplastic elastomer blend comprising a continuous phase and a particulate phase, and a flame retardant wherein the film substrate has a storage modulus of at least about $10^7$ Pascals at temperatures of up to about 150° C.

2. An insulation protection tape according to claim 1 wherein said film substrate comprises a two-phase thermoplastic elastomer blend having a continuous phase formed from a polyolefin selected from polypropylene or polyethylene and a particulate phase formed from a copolymer formed from monomers selected from the group consisting of ethylene, propylene, and diene monomers.

3. An insulation protection tape according to claim 1 wherein said thermoplastic elastomer is a mixture having a continuous phase formed from polypropylene and a particulate phase formed from ethylene propylene diene terpolymers.

4. An insulation protection tape according to claim 1 wherein said flame retardant is a nonhalogenated flame retardant.

5. An insulation protection tape according to claim 1 wherein said flame retardant is a brominated flame retardant.

6. An insulation protection tape according to claim 5 wherein said brominated flame retardant is selected from the group consisting of ethylene-bis(tetrabromophthalimide), decabromodiphenyl oxide, and tetrabromocyclooctane.

7. An insulation protection tape according to claim 1 wherein said film substrate further comprises a metal compound synergist selected from the group consisting of alkaline earth metal oxides, silicon dioxide, titanium dioxide, zinc oxide, aluminum oxide, aluminum oxide trihydrate, antimony oxides, and alkaline earth metal hydroxides.

8. An insulation protection tape according to claim 7 wherein said synergist is antimony trioxide.

9. An insulation protection tape according to claim 1 wherein said film substrate contains less than about 100 ppm leachable chlorides.

10. An insulation protection tape according to claim 1 wherein said film substrate further comprises a filler.

11. An insulation protection tape according to claim 10 wherein said filler is talc.

12. An insulation protection tape according to claim 1 wherein said film substrate further comprises an antioxidant.

13. An insulation protection tape according to claim 1 wherein said thermoplastic elastomer comprises from about 45% to about 75% of the composition.

14. An insulation protection tape according to claim 13 comprising from about 5% to about 25% of a brominated flame retardant.

* * * * *